United States Patent
Kunas et al.

(10) Patent No.: US 8,168,921 B1
(45) Date of Patent: May 1, 2012

(54) METHOD AND SYSTEM FOR MARKING A MATERIAL USING A LASER MARKING SYSTEM

(75) Inventors: Bradley Kunas, Villa Park, IL (US); John Hankus, Chicago, IL (US); Dave Colin Evans, Ontario (CA); Joseph William Banderob, Ontario (CA); Robert C. Easton, Ontario (CA)

(73) Assignee: Klein Tools, Inc., Lincolnshire, IL (US)

( * ) Notice: Subject to any disclaimer, the term of this patent is extended or adjusted under 35 U.S.C. 154(b) by 43 days.

(21) Appl. No.: 12/820,568

(22) Filed: Jun. 22, 2010

Related U.S. Application Data

(63) Continuation of application No. 12/568,391, filed on Sep. 28, 2009.

(51) Int. Cl.
*B23K 26/00* (2006.01)
(52) U.S. Cl. .......... 219/121.68; 219/121.69; 219/121.83
(58) Field of Classification Search ............. 219/121.68, 219/121.69, 121.83, 121.85
See application file for complete search history.

(56) References Cited

U.S. PATENT DOCUMENTS

| | | | |
|---|---|---|---|
| 2,479,224 A | 8/1949 | Finn | |
| 2,600,722 A | 9/1949 | Atkinson | |
| 2,577,532 A | 12/1951 | Loomis | |
| 3,081,977 A | 3/1963 | Weisberger | |
| 5,229,573 A * | 7/1993 | Stone et al. | 219/121.68 |
| 5,229,574 A * | 7/1993 | Stone | 219/121.68 |
| 5,605,641 A * | 2/1997 | Chiba et al. | 219/121.68 |
| 5,653,900 A * | 8/1997 | Clement et al. | 219/121.68 |
| D404,323 S | 1/1999 | Jackson | |
| 6,087,623 A * | 7/2000 | Kwon et al. | 219/121.68 |
| 6,319,618 B1 | 11/2001 | Kelley et al. | |
| 6,598,860 B2 | 7/2003 | Poole | |
| 6,734,392 B2 * | 5/2004 | Philipp et al. | 219/121.82 |
| D506,939 S | 7/2005 | King | |
| 2001/0029676 A1 | 10/2001 | Biglin et al. | |
| 2003/0192193 A1 | 10/2003 | Potts et al. | |
| 2006/0182471 A1 * | 8/2006 | Okamura et al. | 399/298 |
| 2009/0159862 A1 | 6/2009 | Wong et al. | |
| 2009/0266804 A1 * | 10/2009 | Costin et al. | 219/121.85 |

* cited by examiner

*Primary Examiner* — M. Alexandra Elve
(74) *Attorney, Agent, or Firm* — McDonnell Boehnen Hulbert & Berghoff LLP

(57) ABSTRACT

A laser marking system for marking a length of material includes a laser device for emitting a marking beam. A motor moves the length of material relative to the laser device. A sensing system detects a predetermined movement of the length of the material and provides a speed signal and a distance signal, and a controller is provided in operative communication with the sensing system and the laser device for receiving the speed signal and the distance signal and responsively directing the marking beam of the laser system onto the length of material in a predetermined pattern.

21 Claims, 6 Drawing Sheets

METHOD AND SYSTEM FOR MARKING A MATERIAL USING A LASER MARKING SYSTEM

CROSS-REFERENCE TO RELATED APPLICATION

The present patent application claims priority under 35 U.S.C. §120 to a corresponding patent application filed in the United States and having application Ser. No. 12/568,391, filed on Sep. 28, 2009, the entire contents of which are herein incorporated by reference.

FIELD

The patent application is directed to systems and methods for marking elongate materials. In particular, the patent application is directed to systems and methods for on-the-fly marking of fish tape with a laser.

BACKGROUND

In the course of installing wire into conduit, an electrician generally uses a tool typically known as a fish tape. The fish tape can be used by electricians to route or pull electrical wiring through walls and the electrical conduit. Typically, fish tape is a narrow length of flexible steel that is coiled on a spool and packaged in a plastic case for storage and transportation. The fish tape is rigid enough to be pushed through the conduit, yet flexible enough to bend around corners or curves that may be inherent in a particular run of conduit. Wire may need to be used for long distances, and thus, it is typical to have fish tape of lengths of 25 feet, 50 feet, 100 feet, or more. One end of the fish tape, the proximal end, is usually anchored to a stationary or rotatable portion of a reel of spool to keep the end from coming loose. The other end, leading (or distal) end, of the fish tape is adapted in some way (e.g., hooked) to readily attach wire(s) to be pulled by the fish tape through the conduit.

In use, after the fish tape has been inserted through the conduit, the wire to be installed is affixed to the end of the fish tape and the fish tape is pulled back through the conduit to draw the wire with the fish tape. Once through, the wire is typically terminated at any necessary connection on each end and installation of the wire within the conduit is complete.

When installing wires, it is desirable to measure a length of a particular run of conduit and/or a location of an obstruction in the conduit in which the wire is to be installed. An inaccurate measurement or estimate may cause the installer to cut the wire too short, or too long, resulting in wasted scrap wire and therefore wasted money.

One way to measure the length of the run is to use measuring string. Here, the fish tape is first inserted at the proximal end of the run and fished to the distal end of the run. Next, a measuring string (and perhaps an accompanying pull string) is affixed to the leading end of the fish tape appearing at the distal end of the run. Then, the fish tape and the attached string(s) are pulled back through the conduit. When the leading end of the fish tape has been retrieved from the proximal end of the run, the installer can determine the length of the run via the measuring string. The wire(s) may (not necessarily) then be cut to the appropriate length. Finally, to install the wire(s) in the conduit, the wire(s) are then affixed to the leading end of the string(s) appearing at the proximal end of the run and are pulled back through the conduit. Once through, the wire is terminated as necessary.

Another way to measure the run is to first insert the fish tape at the proximal end of the run and to fish the fish tape to the distal end of the run. Once the leading end of the fish tape appears at the distal end of the run, the installer manually marks (perhaps with a piece of tape or a pen, etc.) the section of fish tape that is nearest to the proximal end of the run, pulls out the fish tape, and lays the fish tape on the ground. The distance between the leading end of the tape and the marked section on the tape represents the required length of wire. The wire(s) are then measured against the fish tape and may be cut to the appropriate lengths. In a next step, the fish tape is reinserted at the proximal end of the run and fished to the distal end of the run. Finally, to install the wire(s) in the conduit, the cut wire(s) are then affixed to the leading end of the fish tape appearing at the distal end of the run and are pulled back through the conduit.

SUMMARY

In an example embodiment, a laser marking system for marking elongate materials is disclosed. The laser marking system includes a laser, a sensing system, and a controller. The laser emits a laser beam, and the sensing system detects a movement of the material through the sensing system and responsively provides a speed signal indicative of a rate of movement of the material through the sensing system and a distance signal indicative of a length of the material that has passed through the sensing system. The controller is connected to the laser and the sensing system, and responsive to the speed signal and the distance signal, the controller directs the laser and the sensing system to operate so as to direct the laser beam onto the material in a predetermined pattern.

In another example embodiment, a method of marking a fish tape is disclosed. The method includes receiving the fish tape through a speed sensing system, a distance sensing system, and a marking station positioned between the speed sensing system and the distance sensing system. The method also includes receiving a speed signal indicative of a rate of movement of the fish tape through the speed sensing system and a distance signal indicative of a length of the fish tape that has passed through the distance sensing system, and responsive to the speed signal and the distance signal, directing a laser to mark the fish tape while the fish tape is in the marking station according to a predetermined marking pattern.

In another example embodiment, a laser marking system for marking a material is disclosed. The laser marking system includes a laser for emitting a laser beam, and a speed sensing system for detecting a movement of the material through the speed sensing system and responsively providing a speed signal indicative of a rate of movement of the material through the speed sensing system. The speed sensing system includes a speed idler that includes a speed idler shaft positioned to contact the material as the material passes through the speed idler. The laser marking system also includes a distance sensing system for providing a distance signal indicative of a length of the material that has passed through the distance sensing system. The distance sensing system comprises a distance idler wheel that contacts the material as the material passes through the distance sensing system and determines the distance signal indicative of the length of the material that has passed through the distance sensing system based on rotation of the distance idler wheel. The laser marking system also includes a marking station positioned between the speed sensing system and the distance sensing system and the material passes through the speed sensing system, the marking station, and the distance sensing system. The laser marking system further includes a motor feed system for moving the material through the laser marking system, and a laser controller connected to the speed sensing system and receiving the speed signal indicative of the rate of movement of the material through the speed sensing system. The laser marking system further includes a controller connected to the laser controller, the distance sensing system, and the motor feed system, and is operable to direct a rate at which the motor feed system moves the material through the laser marking system. The controller, responsive to the distance signal, instructs the laser controller to operate the laser so as to direct the laser beam onto the material in a predetermined pattern while the material is in the marking station.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
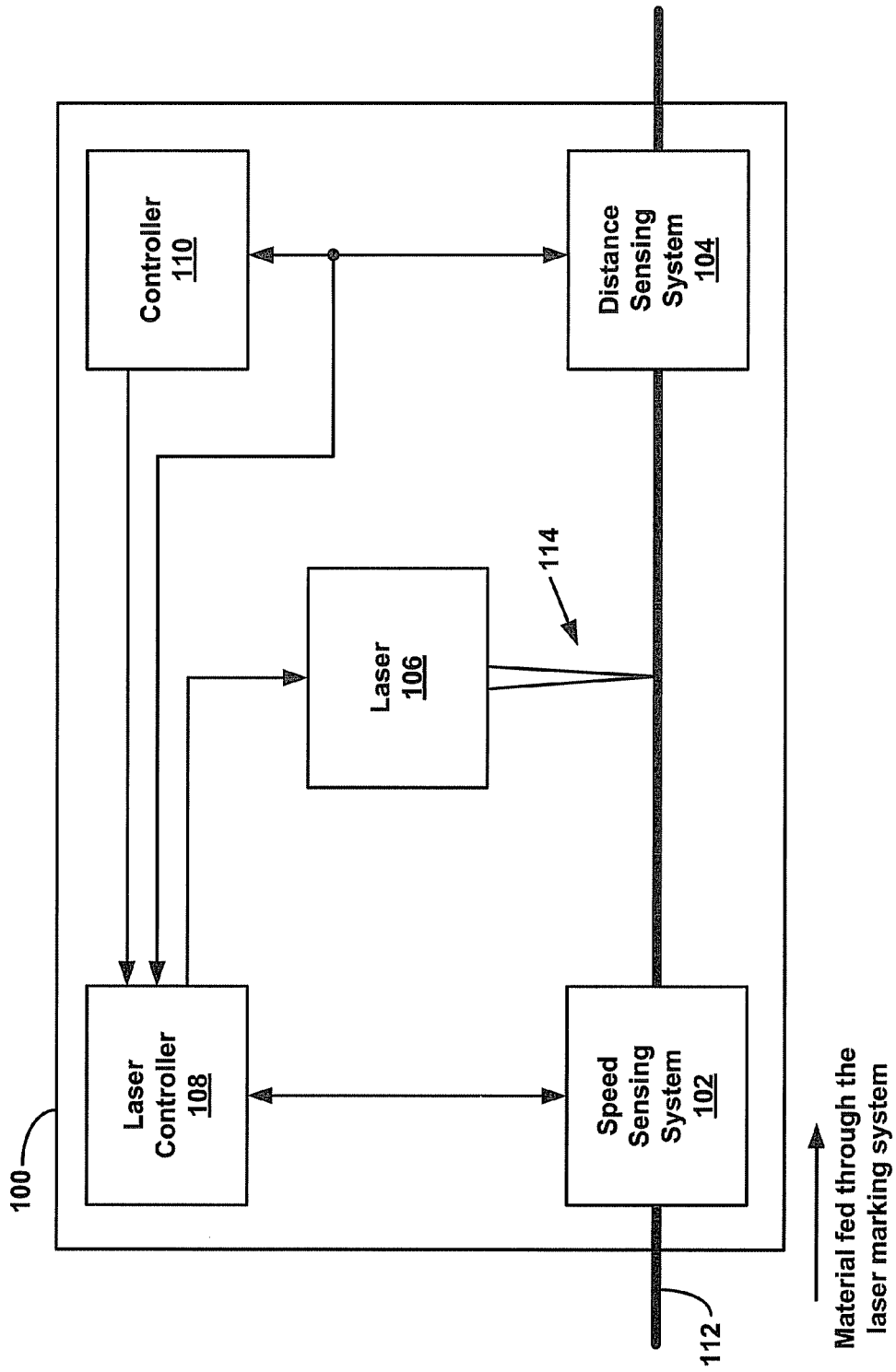
FIG. 1 is a block diagram illustrating an example laser marking system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present application is directed to a method and system for marking elongated materials. The laser marking system includes a laser device for emitting a marking beam, and a motor to move a length of material relative to the laser device. A sensing system detects a predetermined movement of the length of the material and provides a speed signal and a distance signal, and a controller is provided in operative communication with the sensing system and the laser device for receiving the speed signal and the distance signal and responsively directing the marking beam of the laser system onto the length of material in a predetermined pattern.

Referring now to the figures, FIG. 1 illustrates an example laser marking system 100. The laser marking system 100 includes a speed sensing system 102, a distance sensing system 104, a laser 106, a laser controller 108, and a controller 110. A piece or length of material 112 is fed through the laser marking system so that the material 112 traverses through the speed sensing system 102, past the laser 106, and through the distance sensing system 104. The material 112 exits the laser marking system 100, and a cutter (not shown) may cut portions of the material 112 or cut the material 112 after a predetermined portion of the material 112 has been marked, for example.

The speed sensing system 102 may monitor how fast the material 112 is fed through the laser marking system 100. The distance sensing system 104 may monitor how much material or a length of the material 112 that has passed through the distance sensing system 104. The laser 106 may emit a laser beam 114 at the material 112 while the material 112 is underneath the laser 106 to place a mark or marks on the material 112.

The laser controller 108 receives a signal from the speed sensing system 102 indicating a speed of the material 112 through the laser marking system 100, a signal from the distance sensing system 104 indicating how much material 112 has passed through the laser marking system 100, and instructions from the controller 110 indicating when to mark the material 112. The laser controller 108 will output a signal to the laser 106 directing the laser 106 how to mark the material 112.

The controller 110 may be programmed to control operation of the laser controller 108. For example, the controller 110 may receive a signal from the distance sensing system 104 indicating that 50 feet of material have passed through the system, and the controller 110 may then instruct the laser controller 108 to end a marking phase. The controller 110 may also send signals to the distance sensing system 104 indicating to reset to a home position for a new marking cycle, and/or indicating to reset to an offset position for a new marking cycle, for example.

The controller 110 can control application of the laser beam 114 to the material 112 to produce the desired set of marks on the material 112 by sending instructions to the laser controller 108. The controller 110 may be preprogrammed according to a desired marking pattern or list files for each possible material lengths, or may include a user interface (not shown) to allow an operator to input controls to the laser marking system 100, for example.

The controller 110 may also be connected to a motor (not shown) and may provide instructions to the motor indicating how fast the material 112 should be fed through the laser marking system 100 to produce a desired set of marks on the material 112.

The controller 110 may be a programmable logic controller, a field programmable logic array (FPLA), or a computer that can receive signals, and provide corresponding instructions to other components of the system 100, for example.

In FIG. 1, the speed sensing system 102 and the distance sensing system 104 are illustrated as separate components. However, the speed sensing system 102 and the distance sensing system 104 may be combined into one component or one sensor to output both a speed signal indicating a speed of the material 112 through the system 100, and a distance signal indicating an amount of the material 112 that has passed through the system 100. Further, in other configurations, the laser controller 108 and the controller 110 may be combined into one element that controls operation of the system 100. Other configurations are possible as well.

Figure 2:
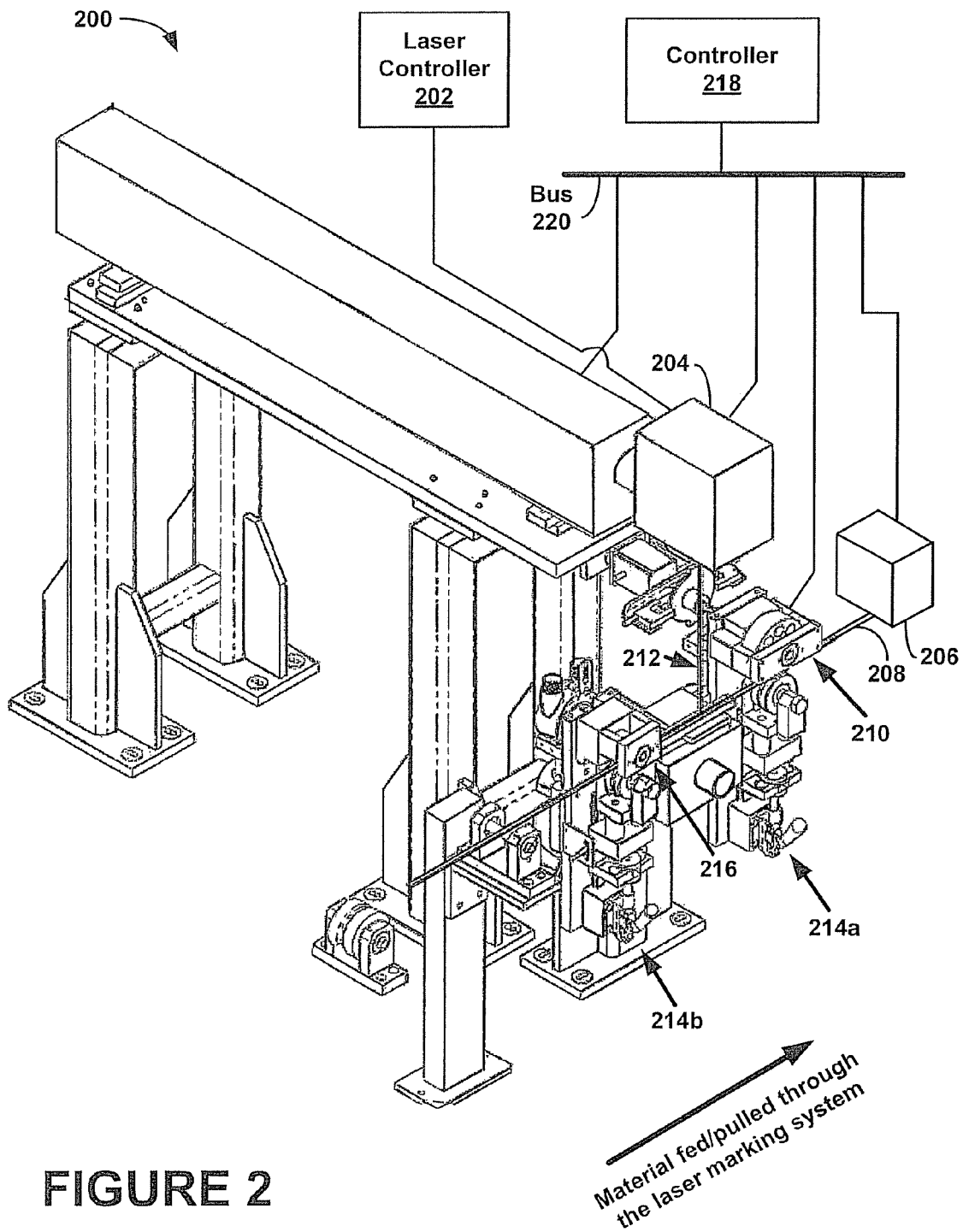
FIG. 2 is a perspective view of an example laser marking system.

FIG. 2 illustrates another example of a laser marking system 200. The laser marking system 200 includes a laser system and controller 202 that controls and emits electromagnetic radiation. The laser controller 202 connects to a scan head 204 that directs the electromagnetic radiation generated by the laser controller 202. A motor feed system 206 moves or pulls a length of material 208 to be marked through a distance sensing system 210 and a speed sensing system 216.

The laser marking system 200 may use any suitable laser capable of dynamic marking (also known as "on-the-fly" marking) of various materials, including metal, such as spring steel and stainless steel. For example, the laser system 202 may include a 100-watt, Class IV laser. An example of a commercially available laser that may be used is a FOBA® Model LP100, which is available from Virtek Vision International Inc. A relatively high power 100-Watt laser permits a high rate of material throughput through the laser marking system 200, for example. A lower power laser may require a slower feed rate of material 208, for example.

The scan head 204 directs a laser beam 212 to produce a mark on the material 208 as the material 208 is moved continuously or intermittently through the laser marking system 200. The scan head 204 may operate according to or include laser control software in the laser controller 202 running, for example, on a Microsoft Windows® platform (e.g., XP or Vista®). The scan head 204 may control motion of mirrors (not shown) in the scan head 204 responsive to signals acquired from at least the distance sensing system 210 so that the laser system 202 is operated to cause marks to be made on the material 208 according to a selected program or one or more stored "recipes." The laser system 202 and the scan head 204 may be available as the FOBA® Model LP100 laser system, and in combination, are suitable for use in producing marks, for example, at one foot intervals on spring steel or stainless steel fish tape at a rate of about 2 meters per second, for example.

The material 208 to be marked may be an elongated member made of tempered spring steel, stainless steel, nylon, fiberglass with a nylon jacket, or multi-stranded steel wire. For example, the material 208 may take the form of fish tape.

The distance sensing system 210 senses and monitors movement of the length of material 208, and generates signals that are used to direct movement of the length of material 208, and operation of the laser system 202 and the scan head 204 as the material 208 passes through the laser marking system 200. The laser controller 202 controls the scan head 204 based on signals received from the distance sensing system 210. For example, the distance sensing system 210 may generate a distance signal indicative of a length of the material 208 that passes through the laser marking system 200. The distance sensing system 210 may also function to provide or receive a "home signal," which provides a cue to the laser marking system 200 to initiate a beginning of a marking cycle, for example (explained more fully below).

The distance sensing system 210 and speed sensing system 216 further include a quick change/release and biasing mechanism 214a and 214b. Generally, each quick change/release and biasing mechanism 214a and 214b has a function of providing an operator with a mechanism to permit removal from and/or insertion of a length of the material 208 into and through the distance sensing system 210 and the speed sensing system 216. An operator may release either of the quick change/release and biasing mechanisms 214a or 214b to unlock the distance sensing system 210 that guides the material 208 through the laser marking system 200. Thus, each quick change/release and biasing mechanism 214a and 214b functions to permit a quick adaptation of the laser marking system 200 to different shapes and sizes of lengths of the material 208. In addition, each quick change/release and biasing mechanism 214a and 214b functions to securely transport the length of material 208 through the laser marking system 200 so that the length of material 208 accurately proceeds through a path of the laser beam 212, and to permit an accurate sensing of both the speed of the length of material 208 and a measurement indicative of the distance of the length of the material 208 passing through the laser marking system 200.

The speed sensing system 216 may generate a speed signal indicative of a speed of the length of material 208 as the material 208 passes through the laser marking system 200. The speed sensing system 216 will output the speed signal to the laser controller 202, which uses the speed information to direct application of the laser 212 to mark the material 208.

The laser marking system 200 also includes a controller 218 connected to various components of the laser marking system 200, such as for example, the motor feed system 206, the distance sensing system 210, the scan head 204 and the laser system 202. The controller 218 may be connected to fewer or more components as needed, and may further be connected to components of the laser marking system 200 through a bus configuration 220, for example.

The controller 218 may be a programmable logic controller and can include, for example, a computer program running on a Microsoft Windows® platform to control functions of the laser marking system 200. The controller 218 controls many functions of the laser marking system 200, and mechanisms (not shown) associated with production of products that are marked by the laser marking system 200. For example, the controller 218 may control a speed of the motor feed system 206, functions of the laser controller 202 (e.g., application of the laser beam 212 by the scan head 204), and other functions described below. Such functions can be accomplished at least in part by sending instructions to adjust the motor feed system 206 to provide a desired feed rate of the material 208, for example.

The laser marking system 200 may be operated to apply marks to the length of material 208 according to a marking cycle. A marking cycle may be defined as the transportation of a predefined length of material through the laser marking system 200 and application of marks to the material in a predefined pattern along the predefined length of material. For example, the predefined length of material may be 100 feet of fish tape and the predefined pattern may be a series of marks applied at each foot along the 100 feet of fish tape. The marks may include a straight line applied at each one-foot interval along the length of the fish tape and a numerical indication associated with each straight line that indicates the distance to one end of the length of the fish tape as measured from the mark.

Figure 3:
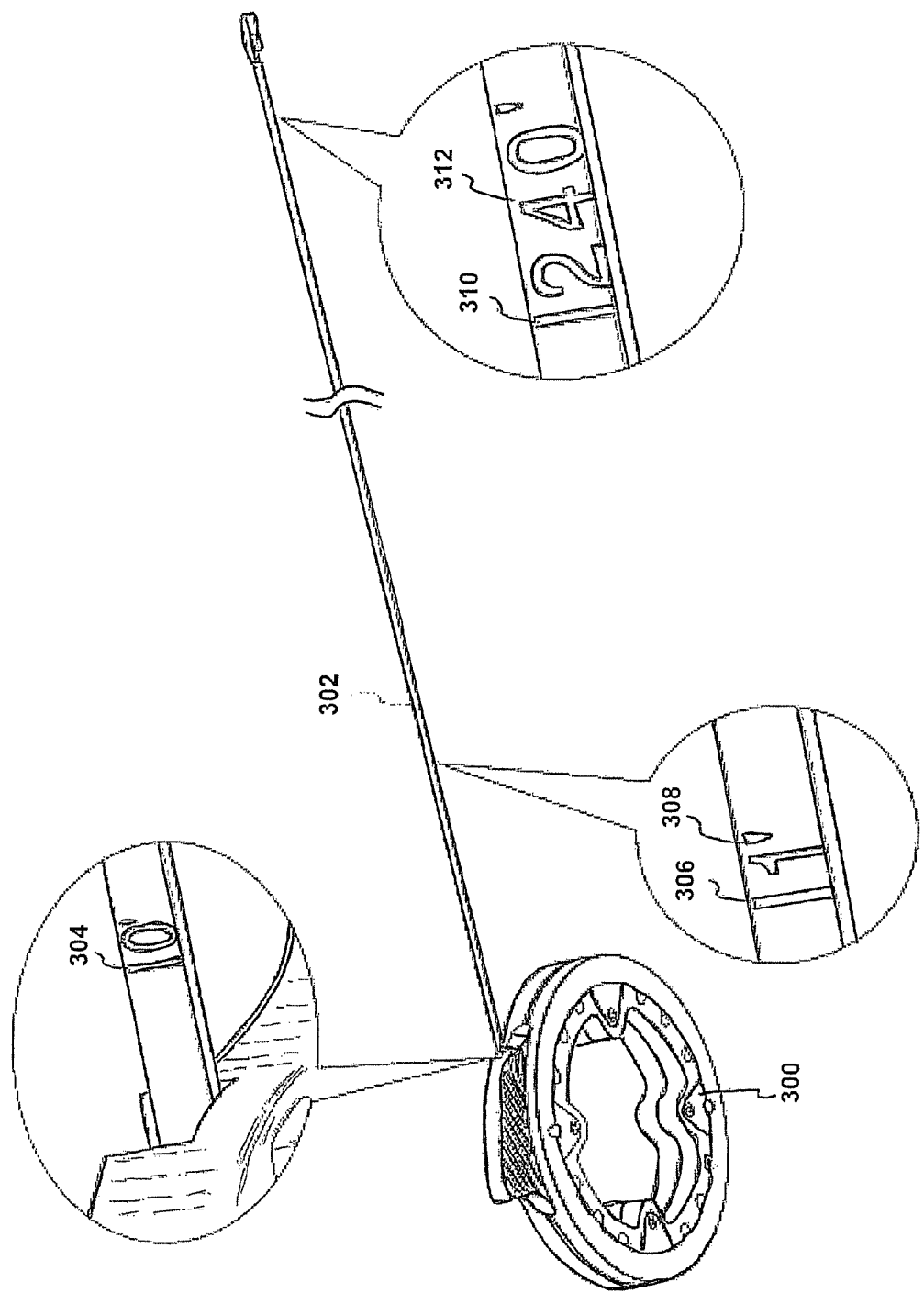
FIG. 3 illustrates an example fish tape reel including a length of fish tape that is marked with indications.

FIG. 3 illustrates an example fish tape reel 300 including a length of fish tape 302 that is marked with indications, such as that shown at 304 as a zero marker indicator. Marks may be made on the fish tape 302 at any desired pattern, as shown by including marks at each foot marker, such as for example, mark 306 at a one-foot length of the fish tape. The marks may also include number indicators representing the length of the fish tape 302, such as a one-foot indicator 308, or a mark 310 and a 240 foot indicator 312 at an end of the fish tape 302. For more information on example types of markings or marking patterns, the reader is referred to U.S. patent application Ser. No. 12/334,637, entitled "Reverse Marked Fish Tape," the entire contents of which are fully incorporated herein by reference as if fully set forth herein.

The laser marking system 200 of FIG. 2 may place marks on material like fish tape, such as numerical indications shown in FIG. 3, at any desired set of indications. For example, the laser marking system 200 may be programmed to mark a fish tape with ascending numbers, descending numbers, or both. The fish tape may have a plurality of marks formed along the fish tape from a first end to a second end, and each of the plurality of marks may be spaced apart from an adjacent mark by a predetermined distance interval. Each of the plurality of marks may also include indicia indicating a distance that each of the plurality of marks is from the second end, for example.

At the end of the marking cycle, the laser marking system 200 resets to begin a new marking cycle. Each foot of fish tape may not be marked, and therefore, the controller 218 may be programmed to apply a masking phase at the end of each marking cycle to mask or prevent marking of a certain amount of material. For example, the masking phase may specify that the initial five feet of each fish tape not be marked. Therefore, during the masking phase, the laser system 202 may not be activated. The controller 218 may instruct the laser system 202 to disregard instructions received from the speed sensing system 216 and distance sensing system 210 to initiate a masking phase, for example.

The laser marking system 200 may be programmed using the controller 218 (and/or the laser controller 202) to mark material according to any desired pattern based on application of the laser 212 to the material 208, and a speed of the motor feed system 206, for example. The motor feed system 206 may vary the rate at which the material is fed through the system 200 to apply a specific pattern of marks to the material 208. Alternatively, or in addition, the scan head 204 may vary a frequency and direction of application of the laser 212 to the material 208 to apply a desired pattern of marks to the material 208. Further, to apply some desired marks, the motor feed system 206 may temporarily stop the material 208 so that the laser 212 may create a more intense mark into the material (e.g., the laser 212 will be focused on a portion of the material 208 for a greater length of time), for example.

Figure 4:
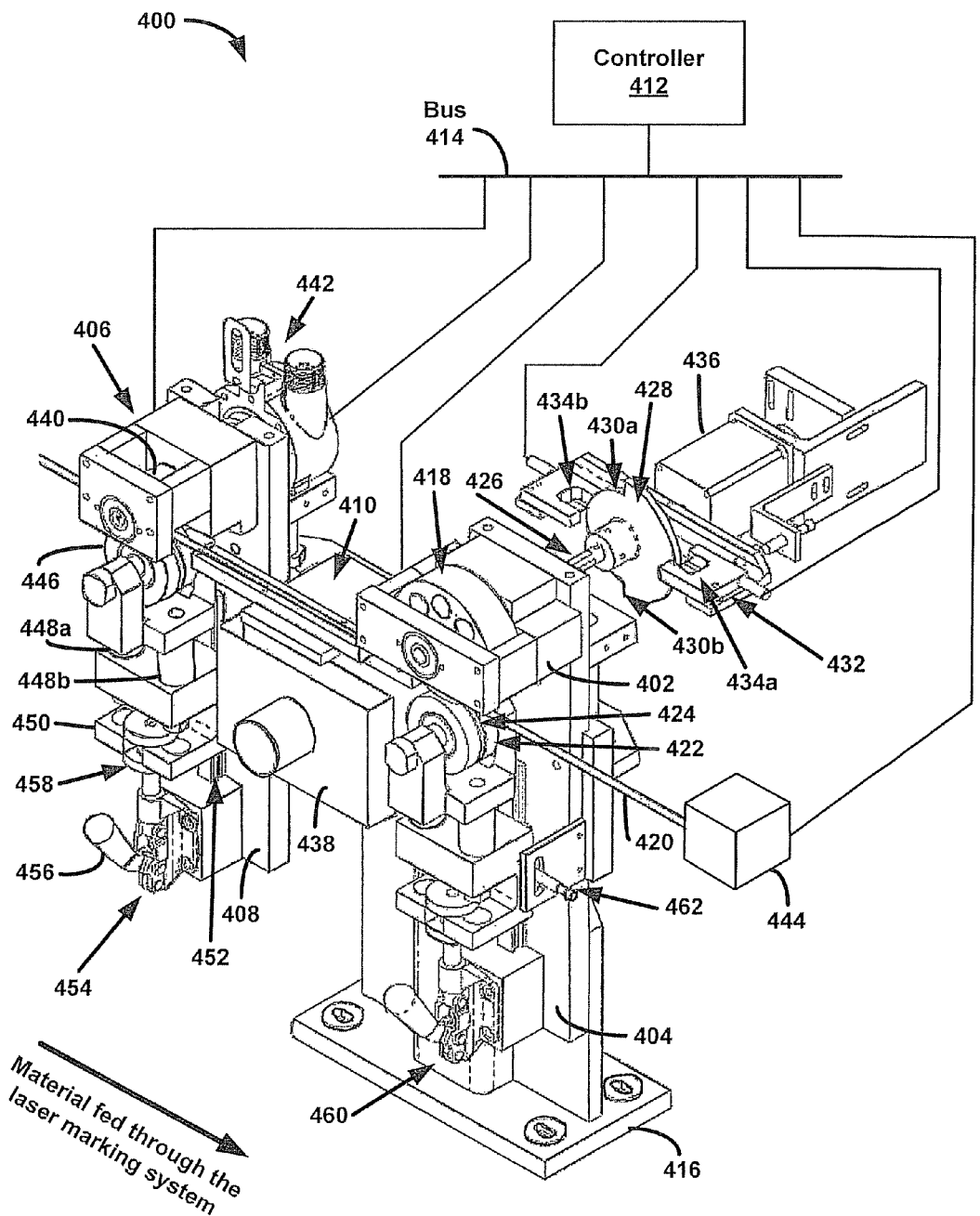
FIG. 4 is a perspective view of another example laser marking system.

FIG. 4 illustrates an example detailed portion of a laser marking system 400 (such as the laser marking system 200 shown in FIG. 2). Many of the components of the laser marking system 400 may be similar to or the same as components of the laser marking system 200 in FIG. 2, and components of the laser marking system 200 not shown in laser marking system 400 of FIG. 4 may also be present (and not shown for simplicity).

The laser marking system 400 includes a distance sensing system 402 connected to a first faceplate 404, a speed sensing system 406 connected to a second faceplate 408, and a marking station 410 between the speed sensing system 406 and the distance sensing system 402. The laser marking system 400 further includes a controller 412 that may be connected to components of the laser marking system 400 directly or through a bus 414. For example, the controller 412 may be connected to the speed sensing system 406 and the distance sensing system 402. The laser marking system 400 may include structural components in addition to the first faceplate 404 and the second faceplate 408, such as a base 416, for example, depending on an application of the laser marking system 400.

The distance sensing system 402 includes a distance idler 418 that can be operated to monitor a distance of material 420 that has been fed through the laser marking system 400. A distance idler wheel 422 is positioned underneath the distance idler 418 and the material 420 is fed between the distance idler wheel 420 and the distance idler 418. The distance idler wheel 422 includes a wheel channel 424 within which the material 420 fits so as to guide the material 420 through the laser marking system 400. The laser marking system 400 may adapt to different materials by providing different configurations of wheel channels. For example, different shapes and sizes of material 420 can be applied to different wheel channel shapes and sizes, such as standard ¼ inch or ⅛ inch widths.

The distance idler 418 is designed to have a circumference that may be related to a desired distance between marks to be applied to the material 420. For example, if the product to be marked is intended to have marks formed at one foot intervals, then the distance idler 418 can have a circumference of one foot. Accordingly, each rotation of the distance idler 418 corresponds to a length of the material 420 passing through the distance sensing system 418 equal to a distance of one foot.

The distance idler 418 may generate a distance cue or signal corresponding to a distance that the length of the material 420 has traveled through the laser marking system 400. The distance cue is transmitted to the controller 412 and indicates to the controller 412 when to operate the laser to create a mark on the length of the material 420 as desired. The distance idler 418 further generates a home position cue or signal that is transmitted to the controller 412 that indicates when and/or where the laser marking system 400 is to begin a new marking cycle, for example.

The distance idler 418 is mounted on a distance idler shaft 426, upon which a trigger disk 428 is also mounted opposite the distance idler 418 and turns with the distance idler 418, for example. For each full rotation of the distance idler 418, the distance idler shaft 426 also rotates one full rotation, and the trigger disk 428 also completes one full rotation. The trigger disk 428 has a face in a form of a flat portion of an outer periphery of the trigger disk 428, and a portion of the outer periphery may be of a smaller radius, for example, to provide slots 430a and 430b on the trigger disk 428.

A sensor bracket 432 is mounted adjacent to and about the trigger disk 428. The sensor bracket 432 includes a pair of oppositely mounted slot sensors 434a and 434b, however, more may be included. A first one of the slot sensors 434a is positioned to sense when the first slot 430a of the trigger disk 428 passes through the slot sensor 434a. A second one of the slot sensors 434b is positioned to sense when the second slot 430b passes through the slot sensor 434b.

When the first slot 430a of the trigger disk 428 passes through the first slot sensor 434a, a marking signal or cue is generated that is sent to the controller 412, which responds by instructing a laser (not shown) and scanner (not shown) when to apply the laser to mark the length of the material 420 with a predetermined mark. Thus, the controller 412 may be connected to each of the sensors 434a and 434b and keeps track or counts each rotation of the trigger disk 428 by counting a number of marking signals, for example. The controller 412 may incrementally adjust the mark according to predefined instructions. For example, the predefined instructions may require that each mark be accompanied by a numerical indication of the distance that the corresponding mark is from an end of the length of the material 420.

The controller 412 is also connected to a stepper motor 436, and at the beginning of a marking cycle, the controller 412 instructs the stepper motor 436 to rotate the trigger disk 428 to a home position or a zero position. The zero position is determined when a home signal or cue is generated when the first slot 430a of the trigger disk 428 passes through the second slot sensor 434b. The stepper motor 436 can rotate the trigger disk 428 past a zero position to rotate the distance idler shaft 426, and in turn, the distance idler 418, to provide an additional length of the material 420 through the laser marking system 400 without any markings, for example. In the configuration shown, each additional 30 degrees of rotation of the trigger disk 428 relative to the sensor bracket 432 corresponds to an inch of length of the material 420, for example. It should be understood that any number of configurations of marks and masking phases can be specified and recorded as instructions in the controller 412.

As mentioned above, the material 420 passes through the distance idler 418 into the marking station 410 along which the laser (not shown) creates a mark on a length of the material 420. The distance sensing system 402 and the speed sensing system 406 bracket the marking station 410 to assure that a length of the material 420 is guided through the marking station 410 in a stable condition. This can assure that a length of the material 420 is held steady as the laser directs the laser beam onto the material 420, for example.

The marking station 410 includes a fume extractor hood 438 connected to a source of negative pressure (not shown) that may extract fumes created by the laser contacting the material 420. The marking station 410 may be in the form of a grooved block, and functions to support and guide the length of the material 420. The fume extractor hood 438 is positioned adjacent the marking station 410 sufficiently close to extract fumes generated during laser marking, for example.

Before passing through the marking station 410 and being marked, the material 420 passes through the speed sensing system 406. The speed sensing system 406 includes a speed idler shaft 440 that may have a general form of an elongate shaft with a portion of the speed idler shaft 440 positioned to contact a length of the material 420 as the material 420 passes through the speed idler 406. A diameter of the speed idler shaft 440 can be from about 10 mm to about 30 mm, or from about 15 mm to about 17 mm (such as, e.g., about 16.17 mm) at a point where the speed idler shaft 440 contacts a length of the material 420 during operation of the laser marking system 400.

The speed idler shaft 440 is connected to a speed encoder 442. The speed encoder 442 may be a Model HS35F-47-T2-SS-2500-AB2C-28V/V-DM18 encoder manufactured by BEI Industrial Encoders, for example. A diameter of the speed idler shaft 440 may match a resolution of the speed encoder 442 to provide a sufficient sample rate to assure accurate translation of motion of the laser beam during marking. It should be understood, however, that different arrangements of speed idler shaft diameters and speed encoders may be used as well. To assure sufficient operating accuracy of the laser marking system 400, relatively higher sampling rates may result in correspondingly greater accuracy of laser marking and realization of high throughput rates, for example.

The speed encoder 442 generates a speed signal corresponding to a rate of revolution of the speed idler shaft 440. The speed signal may include pulses corresponding to the rate of revolution of the speed idler shaft 440. The speed signal may also be a different form of output, such as an analog output differing from a series of pulses, corresponding to the rate of revolution of the speed idler shaft 440. It will also be understood that the speed encoder 442 may generate a digital output corresponding to the rate of revolution of the speed idler 406, for example.

The speed encoder 442 may be connected to a laser controller (not shown), and possibly also to the controller 412 to send the speed signal to the laser controller. Alternatively, the controller 412 may include functions of a laser controller to control application of a laser, and thus, the controller 412 may receive signals from the speed encoder 442, for example. The speed signal can be used by the laser controller to direct the laser (not shown) how to mark the material 420.

To control the speed of feeding the material 420 through the laser marking system 400, the controller 412 can direct a motor feed system 444 and control operation of the motor feed system 444.

The laser controller (not shown) can control motion of the scan head (not shown) by responsively translating the speed signal from the speed encoder 442 into an instruction used to control motion or frequency of application of the laser beam. Accurate motion of the laser beam results in accurate production of desired mark(s), numbers, or any other indicia that the laser marking system 400 is programmed to generate along the length of the material 420.

A speed idler wheel 446 is positioned underneath the speed idler 406 to contact the material 420 and force the material 420 against the speed idler shaft 440. A pair of biasing springs 448*a* and 448*b* is positioned under the speed idler wheel 446 to create a bias force between the speed idler wheel 446, the material 420, and the speed idler shaft 440. It should be understood that the biasing springs 448*a* and 448*b* may be one or a number of springs or biasing elements. A force generated by the biasing springs 448*a* and 448*b* assures that the material 420 is sufficiently contacted and forced against the speed idler shaft 440 such that rotation of the speed idler shaft 440 accurately forces the material 420 through the speed idler 406. In other words, the force generated by the biasing springs 448*a* and 448*b* may be sufficient to prevent slippage of the speed idler shaft 440 to accurately read a speed of the passing length of the material 420, for example.

The biasing springs 448*a* and 448*b* may be held, at least in part, by a guide block 450. The guide block 450 may move up and down on a slide way 452. The slide way 452 may be a dovetail way, or any suitable or similar arrangement, for example.

The laser marking system 400 further includes a quick-change mechanism or cam mechanism 454 attached to the second faceplate 408. The cam mechanism 454 may include a toggle clamp or cam lever 456 and a toggle clamp coupler 458. The toggle clamp coupler 458 attaches the cam mechanism 454 to the guide block 450. Manipulation of the cam lever 456 causes the toggle clamp coupler 458 to move the guide block 450 up and down according to the direction that the cam lever 456 is moved, for example.

In operation, when the speed system guide block 450 is moved in the direction of the speed idler shaft 440, the biasing springs 448*a* and 448*b* are compressed, thus forcing the speed idler wheel 446 against the material 420, which causes secure contact between the material 420 and the speed idler shaft 440. In this condition, the cam mechanism 454 can be considered to be in a closed state.

Conversely, when the speed system guide block 450 is moved away from the direction of the speed idler shaft 440, the material 420 is freed from the speed idler wheel 446 and the speed idler shaft 440. When freed from between the speed idler wheel 446 and the speed idler shaft 440, the material 420 can be removed from the speed idler 406, or a new length of material can be inserted therein. In addition, the speed idler wheel 446 can be replaced with a new wheel, or a different size and shape of speed idler wheel can be inserted into the speed idler 406. In this condition, the cam mechanism 454 can be considered in an open state.

The distance idler 418 includes a quick-change mechanism or cam mechanism 460 that is similar in structure and function to the cam mechanism 454 used in the speed idler 406. The cam mechanism 460 is mounted to the first faceplate 404. The cam mechanism 460 may be operated to lower the distance idler wheel 422 to replace the distance idler wheel 422, for example, or to unlock the material 420 for a variety of reasons.

The cam mechanism 454 or the cam mechanism 460 can each additionally include a safety interlock 462, or one safety interlock 462 may function for both the cam mechanism 454 and the cam mechanism 460. When the cam mechanism 454 or 460 is in an open condition or state, the safety interlock 462 prevents operation of the motor feed system 444, and when the cam mechanism 454 or 460 is in a closed condition or state, the safety interlock 462 permits operation of the motor feed system 444, for example.

The controller 412 may determine whether the cam mechanism 454 or 460 is an open or closed condition by monitoring the state of the safety interlock 462 through a signal received from the safety interlock directly or from the distance idler 418, and permits operation of the motor feed system 444 if the cam mechanism 454 and 460 is closed. It should be understood that the safety interlock 462 can be in the form of a switch, or any suitable mechanism for use by the program logic controller 412 to determine the state of the cam mechanism 454 or cam mechanism 460.

Figure 5:
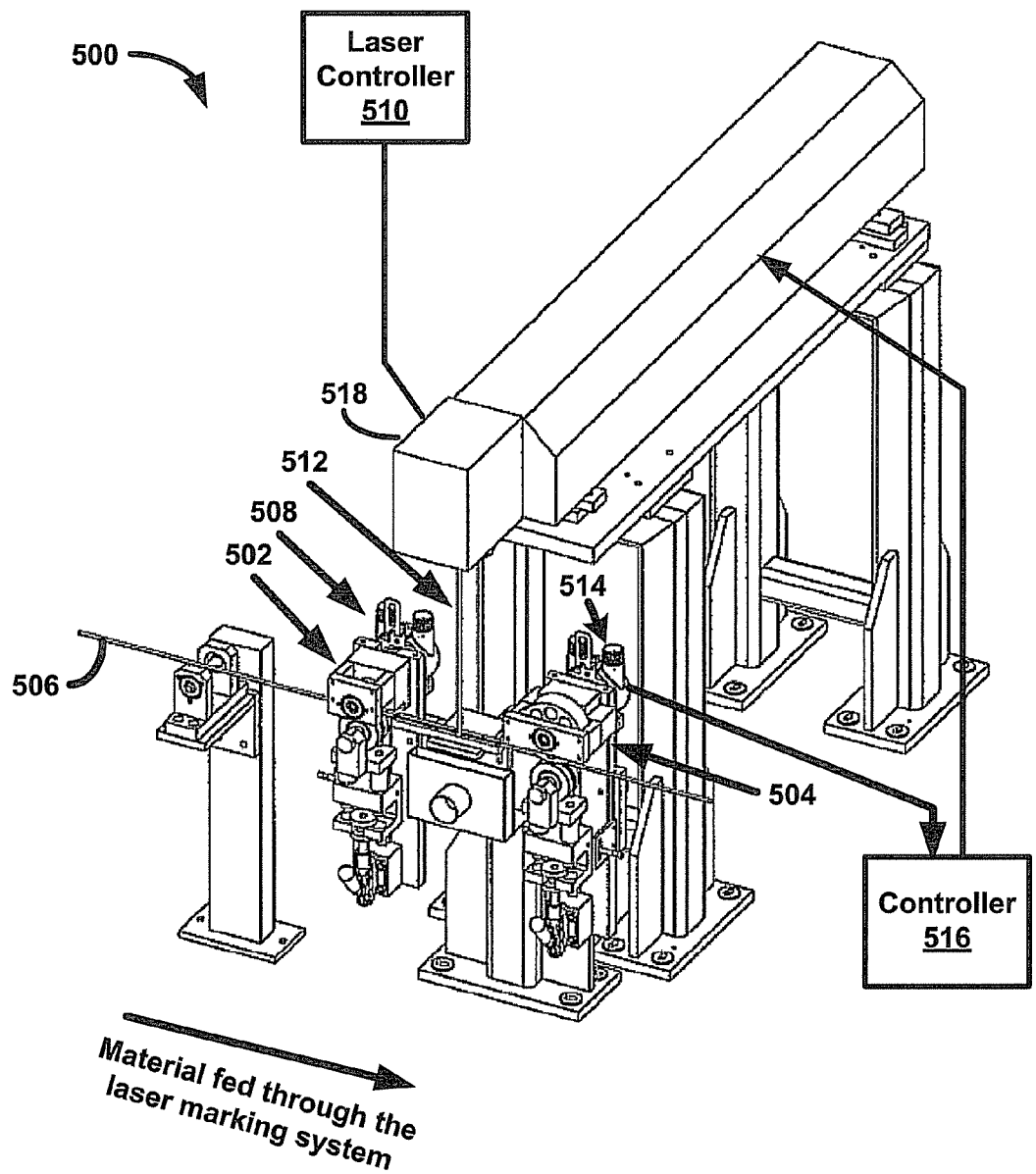
FIG. 5 is a perspective view of another example laser marking system.

FIG. 5 illustrates a detailed portion of another example laser marking system 500 (similar to the laser marking system 400 shown in FIG. 4). Many of the components of the laser marking system 500 may be similar to or the same as components of the laser marking system 400 in FIG. 4, and components of the laser marking system 400 not shown in laser marking system 500 of FIG. 5 may also be present (and not shown for simplicity).

The laser marking system 500 includes a speed sensing system 502 and a distance sensing system 504 through which a length of material 506 traverses. The speed sensing system 502 includes an encoder 508 that outputs a signal indicative of the speed of the material 506 to a laser controller 510. The laser controller 510 controls operation of a laser to direct a laser beam 512 onto the material 506.

The distance sensing system 504 also includes an encoder 514 that outputs a signal indicative of a length of the material 506 that has passed through the system 500 to a controller 516. The controller 516 connects to the laser controller 510 to provide the laser controller 510 with instructions for marking the material 506.

The system 500 operates similar to the system 400 in FIG. 4, except that the distance sensing system 504 includes the encoder 514 to determine the length of the material 506 that has passed through the distance sensing system 504, for example. One example operation sequence or marking cycle for marking the material 506 using the system 500 is described below. Many other marking cycles may also be used depending on an application of the system 500 and material to be marked.

Initially, an operator inputs into the controller 516 a recipe of machine parameters for a predetermined marking pattern. The recipe may contain such information as a starting point of a mark, an acceleration/deceleration rate (ft/sec) and speed (ft/sec) for feeding the material 506 through the system 500, a number of triggers to mask, and a starting mark location (degrees). Example triggers or signals to mask may be four (e.g., so that a first four feet of the material 506 are not marked) and the first mark put on the material 506 will be at the five foot mark. An example speed to run the material 506 through the system 500 is six feet per second with an acceleration and deceleration rate of two feet per second. A starting point of the mark (proximal end) is determined by the last mark of the pattern (distal end) positioned eight inches from a cut off of the material 506, for example.

The controller 516 inputs into the laser controller 510 the recipe for the predetermined marking pattern, and directs the distance sensing system 504 to a home position and an amount of degrees to offset for the starting mark location. The controller 516 also directs a motor (not shown) to feed the material 506 through the system 500 according to the speed parameters.

The controller 516 commands the laser controller 510 to turn on and prepare to start marking. The material 506 begins to traverse through the system 500, and a speed of the material 506 is monitored by the speed sensing system 502, which outputs a speed signal to the laser controller 510. A length of material traversing is monitored by the distance sensing system 504, which outputs a distance signal to the laser controller 510 and the controller 516. The controller 516 is then concurrently masking a predetermined amount of triggers that the distance sensing system 504 is sending the laser controller 510 so that the laser controller 510 will not direct marking of the first four feet of the material 506, for example. The controller 516 will stop masking and allow the laser controller 516 to see the triggers from the distance sensing system 504 at the end of the masking phase.

Once the laser controller 510 sees the trigger from the distance sensing system 504 and receives the signal from the speed sensing system 502, the laser controller 510 sends a command to a scan head 518 to place a mark at the five foot location on the material 506. This sequence is repeated until the predetermined pattern is completed, which depends on the length of the material 506 being marked. An example marking pattern includes marking a foot mark every one foot. During the marking cycle of the foot mark, the laser is directed to operate for approximately 0.04 seconds for spring steel material and approximately 0.50 seconds for stainless steel material, for example.

Once the last foot mark of the pattern is marked, the controller 516 commands the laser controller 510 to stop operating. The material 506 is removed from the system 500 and the cycle begins again by the controller 516 inputting into the distance sensing system 504 for the distance sensing system 504 to return to the home position and the degrees to offset for the starting mark location.

Figure 6:
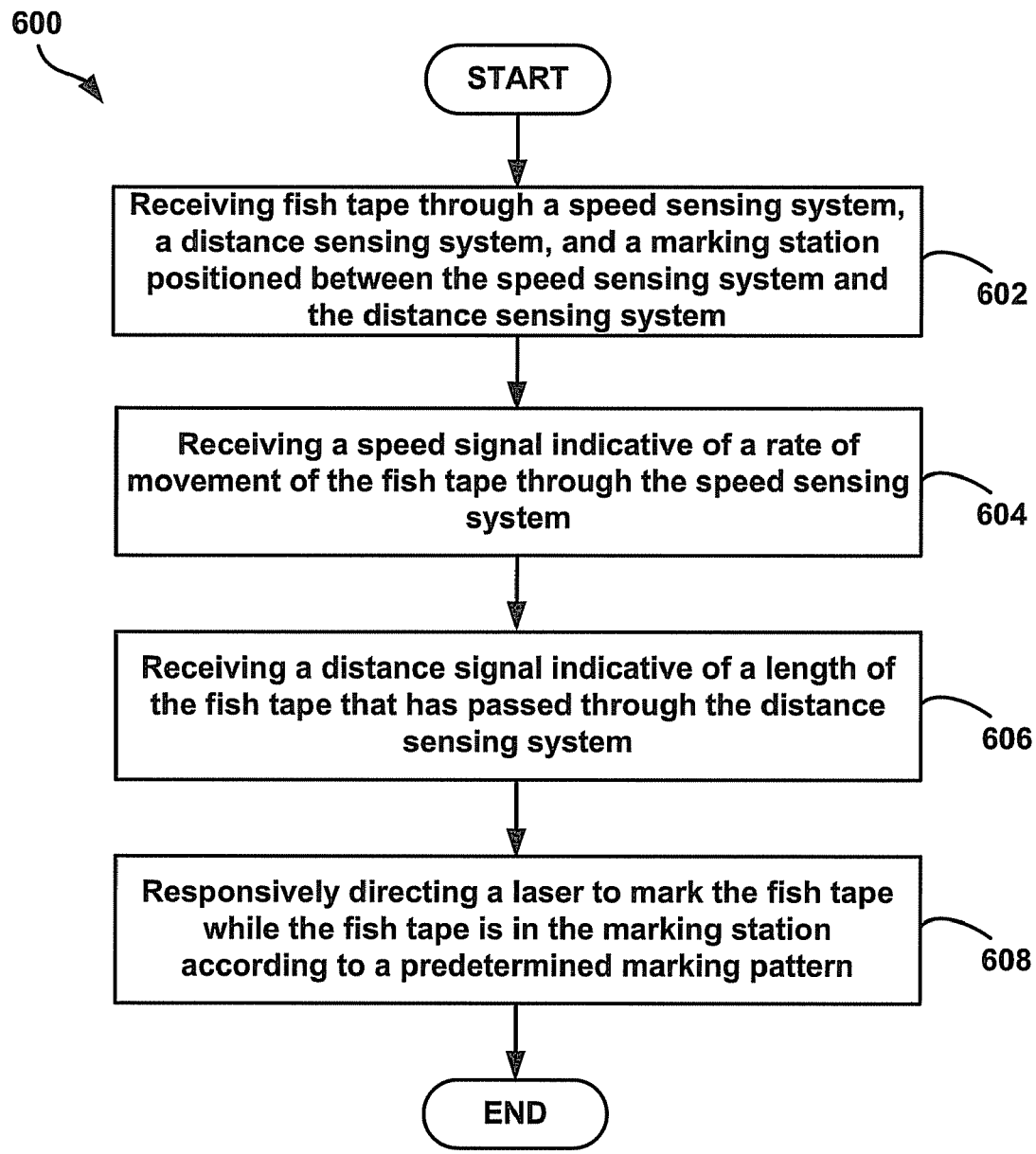
FIG. 6 is a flowchart depicting example steps for marking a material using a laser marking machine.

FIG. 6 is a flowchart summarizing example functional steps 600 for marking a material using a laser marking machine. It should be understood that the flowchart shows functionality and operation of one possible implementation of present embodiments. In this regard, each block may represent a module, a segment, or a portion of program code, which includes one or more instructions executable by a computing device, a processor, or a program logic controller for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

Initially, as shown at block 602, fish tape is received through a speed sensing system, a distance sensing system, and a marking station positioned between the speed sensing system and the distance sensing system. Next, as shown at block 604, a speed signal indicative of a rate of movement of the fish tape through the speed sensing system is received.

Following, a distance signal indicative of a length of the fish tape that has passed through the distance sensing system is received, as shown at block 606. Responsive to the speed signal and the distance signal, a laser is directed to mark the fish tape while the fish tape is in the marking station according to a predetermined marking pattern, as shown at block 608.

Example predetermined marking patterns include marking every foot after an initial five feet of material (e.g., start marking at the five foot mark). Marks may include lines, increments, etc., and any alphanumeric character or symbols. Marking may also be performed using other measuring conventions, such as the metric system.

The laser may be directed to mark the fish tape by applying a constant laser beam to the fish tape, and the predetermined marking pattern can be applied by varying a rate at which the fish tape is fed through the system, for example. The fish tape may be fed through the system continuously, at a varying rate, or even temporarily stopped to apply the predetermined marking pattern.

Various example embodiments have been described. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. Further, many of the elements that are described are functional entities that may be implemented as discrete or distributed components or in conjunction with other components, in any suitable combination and location.

The invention claimed is:

1. A laser marking system for marking a material, comprising:
   a laser configured to emit a laser beam;
   a speed sensing system configured to detect a movement of the material through the speed sensing system on-the-fly and responsively provide a speed signal indicative of a rate of movement of the material through the speed sensing system, the speed sensing system including a rotating speed idler positioned to contact the material as the material passes through the speed sensing system;
   a distance sensing system configured to provide a distance signal, on the fly, indicative of a length of the material that has passed through the distance sensing system, the distance sensing system including a rotating distance idler positioned to contact the material as the material passes through the distance sensing system, and the rotating distance idler being coupled to either an encoder or a trigger disk, which is configured to generate the distance signal based on rotation of the distance idler;
   a marking station, wherein the material passes through the speed sensing system, the marking station, and the distance sensing system;
   a motor feed system configured to move the material through the laser marking system;
   a laser controller coupled to the speed sensing system and configured to receive the speed signal indicative of the rate of movement of the material through the speed sensing system; and
   a controller coupled to the laser controller, the distance sensing system, and the motor feed system, the controller operable to direct a rate at which the motor feed system is configured to move the material through the laser marking system, the controller responsive to the distance signal configured to instruct the laser controller to operate the laser so as to direct the laser beam onto the material in a predetermined pattern while the material is in the marking station.

2. The system of claim 1, wherein the speed sensing system and the distance sensing system are combined into a single sensing system.

3. The system of claim 1, wherein the material includes an elongate material.

4. The system of claim 1, wherein the material is fed through the laser marking system so that the material traverses through the speed sensing system, past the laser, and through the distance sensing system, wherein the system further comprises a cutter configured to cut the material as the material exits the laser marking system and after a predetermined portion of the material has been marked.

5. The system of claim 1, wherein the controller is configured to send a signal to the distance sensing system indicating to reset to a home position for a new marking cycle after completion of marking a predetermined length of the material.

6. The system of claim 1, wherein the controller is configured to instruct the laser controller to operate according to a marking pattern that corresponds to a total length of material for a product.

7. The system of claim 1, wherein the controller includes one or more of a programmable logic controller or a field programmable logic array (FPLA).

8. The system of claim 1, wherein the motor feed system is configured to pull the material through the distance sensing system and the speed sensing system.

9. The system of claim 1, wherein the laser is configured to produce marks on the material at a rate of about 2 meters per second.

10. The system of claim 1, wherein the distance idler includes a wheel channel within which the material is guided.

11. The system of claim 1, wherein the distance sensing system further comprises a distance idler wheel urged against the distance idler, and where the material is fed between the distance idler wheel and the distance idler.

12. The system of claim 11, wherein the distance idler includes a circumference related to a distance between marks to be applied to the material.

13. The system of claim 11, wherein the controller is configured to receive a signal indicative of rotation of the trigger disk, and based on the signal to instruct the laser controller when to apply the laser so as to mark the material.

14. The system of claim 11, further comprising a stepper motor coupled to the trigger disk, wherein the controller is configured to instruct the stepper motor to rotate the trigger disk to a home position for a beginning of a marking cycle.

15. The system of claim 1, further comprising a speed encoder coupled to the speed idler and configured to detect rotation of the speed idler and to output a signal to the laser controller, wherein the laser controller is configured to control operation of the laser.

16. The system of claim 1, wherein the speed sensing system further comprises a speed idler wheel urged against the speed idler, and where the material is fed between the speed idler wheel and the speed idler.

17. The system of claim 16, further comprising a biasing spring positioned to provide a bias force between the speed idler wheel, the material, and the speed idler.

18. The system of claim 1, wherein the marking station is positioned between the speed sensing system and the distance sensing system.

19. The system of claim 1, wherein the laser controller is configured to direct the laser to direct the laser beam onto the material according to a marking cycle, and wherein the controller is configured to direct the laser controller to apply a masking phase during the marking cycle so as to not mark a portion of the material.

20. The system of claim 1, wherein the controller is configured to mask the speed signal received by the laser controller to prevent marking a portion of the material.

21. The system of claim 1, wherein the speed sensing system is configured to receive the material from a reel of material.

* * * * *